(12) United States Patent
Lloyd et al.

(10) Patent No.: US 9,626,301 B2
(45) Date of Patent: Apr. 18, 2017

(54) IMPLEMENTING ADVANCED CACHING

(71) Applicant: Facebook, Inc., Menlo Park, CA (US)

(72) Inventors: Wyatt Andrew Lloyd, New York, NY (US); Linpeng Tang, Princeton, NJ (US); Qi Huang, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 131 days.

(21) Appl. No.: 14/316,395

(22) Filed: Jun. 26, 2014

(65) Prior Publication Data

US 2015/0378914 A1    Dec. 31, 2015

(51) Int. Cl.
*G06F 12/122* (2016.01)
*G06F 3/06* (2006.01)
*G06F 12/0871* (2016.01)

(52) U.S. Cl.
CPC .............. *G06F 12/122* (2013.01); *G06F 3/06* (2013.01); *G06F 12/0871* (2013.01); *G06F 2212/1024* (2013.01); *G06F 2212/222* (2013.01); *G06F 2212/282* (2013.01); *G06F 2212/69* (2013.01)

(58) Field of Classification Search
CPC ............... G06F 12/0848; G06F 12/122; G06F 2212/282; G06F 2212/69
See application file for complete search history.

(56) References Cited

U.S. PATENT DOCUMENTS

| 2008/0059692 A1* | 3/2008 | Erez | G06F 12/0246 711/103 |
| 2009/0172315 A1* | 7/2009 | Iyer | G06F 9/5016 711/158 |

\* cited by examiner

*Primary Examiner* — Eric S Cardwell
(74) *Attorney, Agent, or Firm* — Perkins Coie LLP

(57) ABSTRACT

Embodiments are disclosed for implementing a priority queue in a storage device, e.g., a solid state drive. At least some of the embodiments can use an in-memory set of blocks to store items until the block is full, and commit the full block to the storage device. Upon storing a full block, a block having a lowest priority can be deleted. An index storing correspondences between items and blocks can be used to update priorities and indicated deleted items. By using the in-memory blocks and index, operations transmitted to the storage device can be reduced.

20 Claims, 8 Drawing Sheets

|   | name | priority | deleted? | block | ... |
|---|---|---|---|---|---|
| 310 | name 1 | 0.5 | N | 204a | |
| 312 | name 2 | 0.35 | N | 204c | |
| 314 | name 3 | 0.12 | Y | 204a | |
| 316 | name 5 | 0.99 | N | 204m | |
|   | ⋮ | ⋮ | ⋮ | ⋮ | ⋮ |

302 / 304 / 306 / 308 / 300

|  | 302 | 306 | 318 | 300 |
|---|---|---|---|---|
|  | name | deleted? | virtual block | ... |
| 310 | name 1 | N | 204a |  |
| 312 | name 2 | N | 204c |  |
| 314 | name 3 | Y | 204a |  |
| 316 | name 5 | N | 204m |  |
|  | ⋮ | ⋮ | ⋮ | ⋮ |

*FIG. 3B*

IMPLEMENTING ADVANCED CACHING

BACKGROUND

Some web sites store many documents and a subset of these documents is accessed frequently. For example, social network web sites can store billions of photographs, and a subset of these photographs can be very frequently accessed for an initial period of time (e.g., soon after the photograph is first "shared" with friends) and then rarely accessed thereafter. Web site operators, e.g., social network web sites, can employ caching techniques to reduce the overhead associated with accessing these documents, but must manage a tradeoff between having very many web site servers to enable quick access to these documents and large caches to reduce load on the servers. These tradeoffs can affect speed and cost. For example, caching can be done using relatively more expensive hardware, e.g., solid state drives (SSDs) instead of disk drives to provide faster speeds.

An example of a caching algorithm is a "least recently used" (LRU) cache. An LRU cache discards the least recently used items first. For example, a photograph that is popularly accessed may remain in a cache for an extended period, whereas a photograph that is accessed rarely may be discarded from the cache. Other advanced caching algorithms also exist. The LRU algorithm can keep an initially posted photograph in the cache and then eventually discard the cache as the photograph becomes less frequently accessed.

Priority queues can be used to implement various advanced caching algorithms. A priority queue is a data type that is like a regular queue or stack data structure, but where additionally each element has a priority associated with it. To implement an LRU algorithm using a priority queue, priorities of items in the queue can be updated when the items are accessed. Thus, an item that is accessed infrequently would eventually have a low priority and so may be discarded from the queue. On the other hand, an item that is accessed frequently will eventually have a high priority and so may remain in the queue longer than other items.

When using SSDs to store data, it is generally desirable to minimize the number of write operations to reduce an undesirable operation referred to as "write amplification." Write amplification occurs because, unlike with magnetic disks, data in memory must be erased before it is rewritten. This writing and rewriting can cause data to be moved in the SSD, which results in many more writes than the initial write operation. Thus, when an application changes the priority of an item in a priority queue, the SSD may perform multiple writes. It is desirable to reduce the number of writes because SSDs (and memory generally) can have a limited write lifetime. Moreover, it can be advantageous to avoid operations that prevent efficient use SSDs.

BRIEF DESCRIPTION OF THE DRAWINGS

Embodiments disclosed herein may be better understood by referring to the following Detailed Description in conjunction with the accompanying drawings, in which like reference numerals indicate identical or functionally similar elements:

FIG. 3B is another table diagram illustrating data that may be stored in an index, consistent with various embodiments.

DETAILED DESCRIPTION

Figure 1:
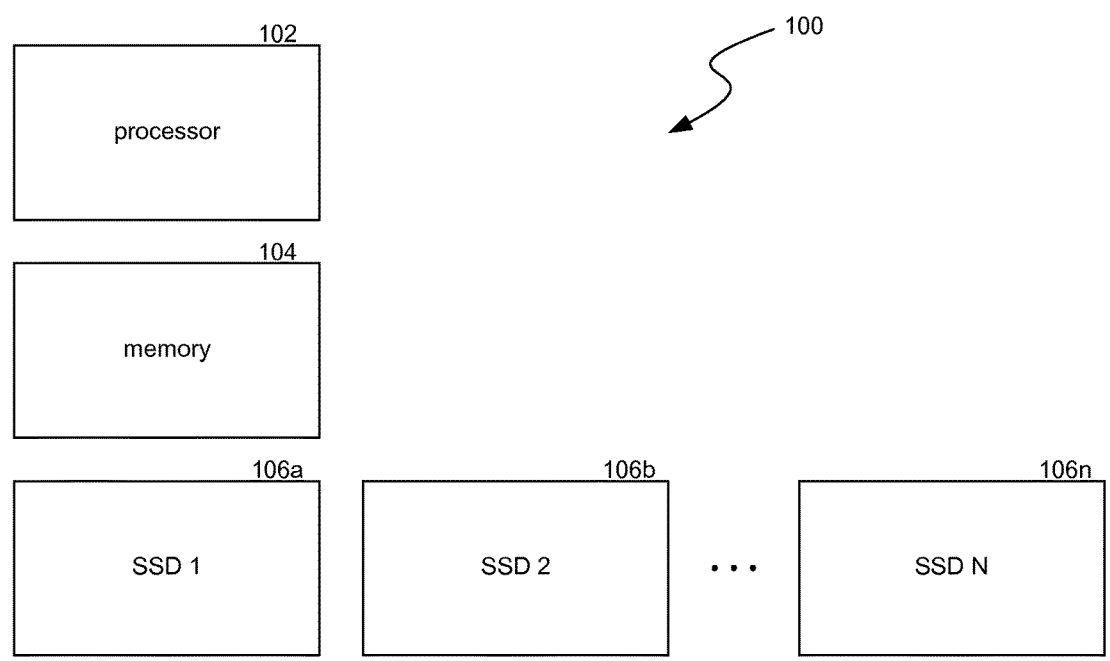
FIG. 1 is a block diagram illustrating an environment in which the technology may operate in various embodiments.

Embodiments are disclosed for implementing advanced caching, e.g., using priority queues, in conjunction with one or more storage devices. Examples of storage devices are solid state drives (SSDs) of various capacities, pluggable cards with flash memory, etc. In various embodiments, one or more storage devices are divided into multiple logical "blocks." The logical blocks can be large enough to store items that are to be tracked in a priority queue or cache, but much smaller than the overall size of the storage device. A small subset of the logical blocks may be identified as "active" blocks. Each active block can have a corresponding block that is stored in a memory region of a computing device that implements the cache. A caching system can provide an application program interface that applications can use to cache items, e.g., photographs, text, etc. As an example, when a social networking web site stores or retrieves a photograph, it may invoke the caching system to perform the storing or retrieving.

Each active block can have associated therewith a priority value. In some embodiments, the active blocks are distributed so that the number of items in adjacent active blocks is roughly equal. In an absolute-priority example, if there are 10 items with priorities between 1 and 5, 20 items with priorities between 6 and 10, and 10 items with priorities between 11 and 15, and the caching system makes four blocks active, it may select as priorities 3, 7, 9, and 13 so that there are approximately 10 items in each of the four active blocks. In a relative-priority example, the priority numbers can be real numbers in the range from 0 to 1. For example, the priority number 0.1 can represent a lower priority than the priority number 0.8. The caching system can process these relative-priorities similarly to the absolute-priorities as discussed above.

When an application adds an item to the cache, the application can invoke the application program interface provided by the caching system. The caching system can store the item in an in-memory block corresponding to an active block in the storage device. The caching system can also add an entry into an in-memory index to indicate in which active block the item was stored. The caching system adds the item to the active block that has a priority that is closest to the added item. In case of a tie (e.g., the priority is exactly between two priorities of active blocks), the caching system can add the item to either block, e.g., a block having fewer items than the other block. When an item having the lowest priority is deleted, the caching system marks the item in the in-memory index as having been deleted, but does not delete the item in the storage device. When an item is read, the caching system looks up its location (e.g., block identifier) in the in-memory index and then reads the item from the storage device.

The index can store information about items stored in all blocks, whether the blocks are active or not. In some embodiments, the index stores information only about items stored in non-active blocks. The information can include, for each item, its name, location (e.g., logical block), priority, etc. When an in-memory block becomes full (e.g., can accommodate no more items), the caching system can commit the now full block to the storage device and erase an older block in the storage device. In some embodiments, the active block with the lowest priority is erased. Before erasing the block in the storage device, the caching system first reads that block into memory. The caching system then discards all items in that block that are marked in the in-memory index as having been deleted and removes entries in the index for those items. The caching system then begins populating a new block in memory and assigns a new active block in the storage device. In some embodiments, the new active block is assigned a priority that minimizes the maximum difference between priority values for all active blocks. As an example, if there are four blocks with priorities 3, 7, 9, and 15, the caching system may assign a priority of 12 to the new block to minimize the maximum difference between 9 and 15. The remaining items in the erased block that are not indicated in the index as having been deleted are then inserted into the active blocks closest to the priorities of those items. In relative-priority embodiments, the caching system can assign a priority to a block so as to minimize the maximum number of items between priorities. For example, if there are four blocks with priorities 0.1, 0.3, 0.5 and 0.9, the caching system may assign a priority of 0.8 to a new block to minimize the maximum number of items between priorities (e.g., there are three groups in a first relative-priority range of 0 to 0.5, but there is only one group in a second relative-priority range of 0.51 to 1). Similarly, the remaining items in the erased block that are not indicated in the index as having been deleted are then inserted into the active blocks closest to the priorities of those items.

When an item's priority is increased, e.g., because it is read, the caching system updates the priority value in the in-memory index, but does not modify its value in the storage device. By postponing writing to the storage device, write-related issues (e.g., bandwidth and write amplification) are reduced. Moreover, because blocks are larger than items, the buffered writes improve the efficiency of using storage devices (e.g., SSDs) for priority queues.

In the foregoing and following descriptions, although SSDs may be used for convenience of description, it is to be understood that other solid state memory-based storage devices can also be employed.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

FIG. 1 is a block diagram illustrating an environment 100 in which the technology may operate in various embodiments. The environment 100 can be a portion of a computing device, e.g., a general-purpose computing device or a special purpose computing device. The environment 100 can include a processor 102, e.g., a central processing unit, a memory 104, and one or more solid state drives (SSDs) 106a, 106b, and 106n. In various embodiments, multiple such environments 100 may be deployed, e.g., as web server computing devices, caching system computing devices, etc.

Figure 2:
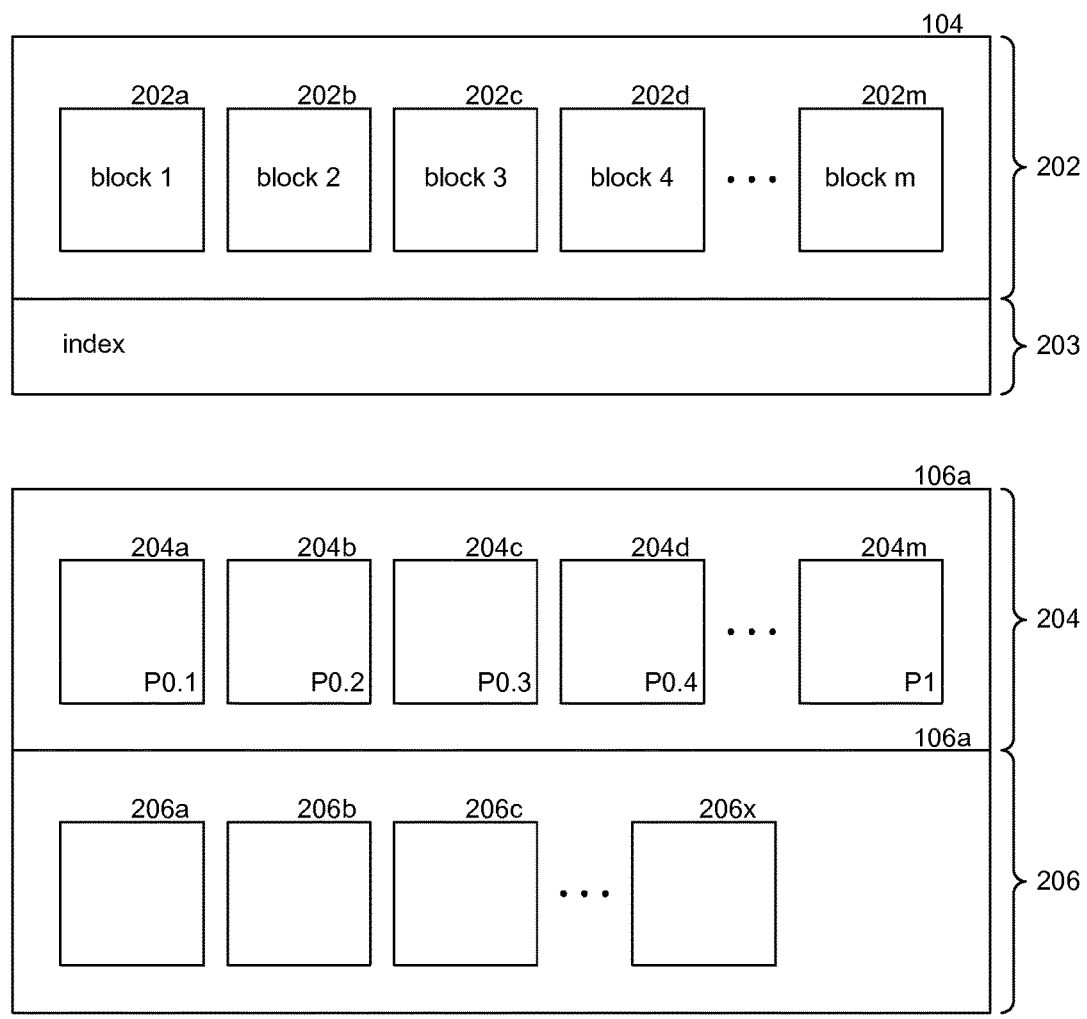
FIG. 2 is a block diagram illustrating items that may be stored in a memory or a solid state drives in various embodiments.

FIG. 2 is a block diagram illustrating items that may be stored in a memory 104 or a solid state drive 106a in various embodiments. The memory 104 can have a blocks region 202 and an index region 203. The blocks region 202 can store one or more in-memory blocks, e.g., 202a, 202b, 202c, and 202m. The index region 203 can store an index of stored items, as further described below.

The illustrated SSD 106a can have an active blocks region 204 and an inactive blocks region 206. The active blocks region 204 can store one or more blocks that are also cached in memory 104. For example, block 204a stored in the SSD 106a can correspond to block 202 that is stored in memory 104. In various embodiments, some or all blocks in the active blocks region 204 can be cached in the blocks region 202 of memory 104. Each block in active blocks region 204 can have associated therewith a priority. For example, block 204a has priority 0.1, block 204b has priority 0.2, block 204c has priority 0.3, block 204d has priority 0.4, and block 204m has priority 1.0. The inactive blocks region 206 can store blocks that are not presently cached in memory 104.

In various embodiments, each block is larger than items to be stored in the priority queue (e.g., in a cache), but much smaller than the total space available in the SSD. For example, there may be hundreds of blocks in an SSD. In some embodiments, the number of active blocks may be between 10 and 30.

Figure 3A:
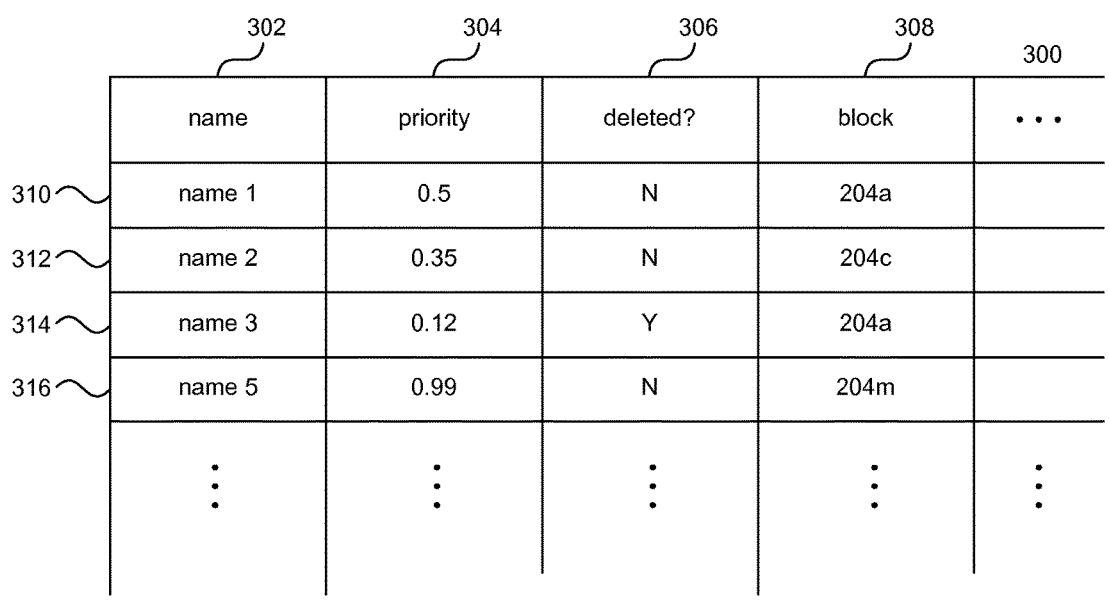
FIG. 3A is a table diagram illustrating data that may be stored in an index, consistent with various embodiments.

FIG. 3A is a table diagram illustrating data that may be stored in an index, consistent with various embodiments. The index can indicate a name 302 for each item, a priority 304 associated with the item, an indication 306 of whether the item is deleted, and a block number 308 (e.g., logical or physical block numbers) of the items stored. Row 310 indicates that an item with name "name 1" has a priority of 0.05, is not deleted, and is stored at block 204a; row 312 indicates that an item with name "name 2" has a priority of 0.35, is not deleted, and is stored at block 204c; row 314 indicate that an item with name "name 3" has a priority of 0.12, has been deleted, and is stored at block 204a; and row 316 indicates that an item with name "name 5" has a priority of 0.99, is not deleted, and is stored at block 204m. In various embodiments, items can be stored in blocks having nearest priorities. For example, item 310 can be stored in block 204a because block 204a has a priority of 0.1 whereas block 204b has a priority of 0.2, and the priority for item 310 is 0.05, which is closer mathematically to 0.1 than to 0.2.

FIG. 3B is another table diagram illustrating data that may be stored in an index, consistent with various embodiments. In the illustrated embodiment, the index can indicate a name 302 for each item, an indication 306 of whether the item is deleted, and a virtual block number 318 (e.g., a logical block number) of the items stored. Comparing to the embodiments described in FIG. 3A, the index described here does not include a priority column and only includes virtual block numbers (i.e., no physical block number). By doing so, the index described in FIG. 3B can have a smaller size than the embodiments described in FIG. 3A. In various embodiments, system administrators can determine which information should be included in the index table, depending on various factors, such as availability of computing resources and/or system efficiency.

While FIGS. 3A and 3B and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Figure 4:
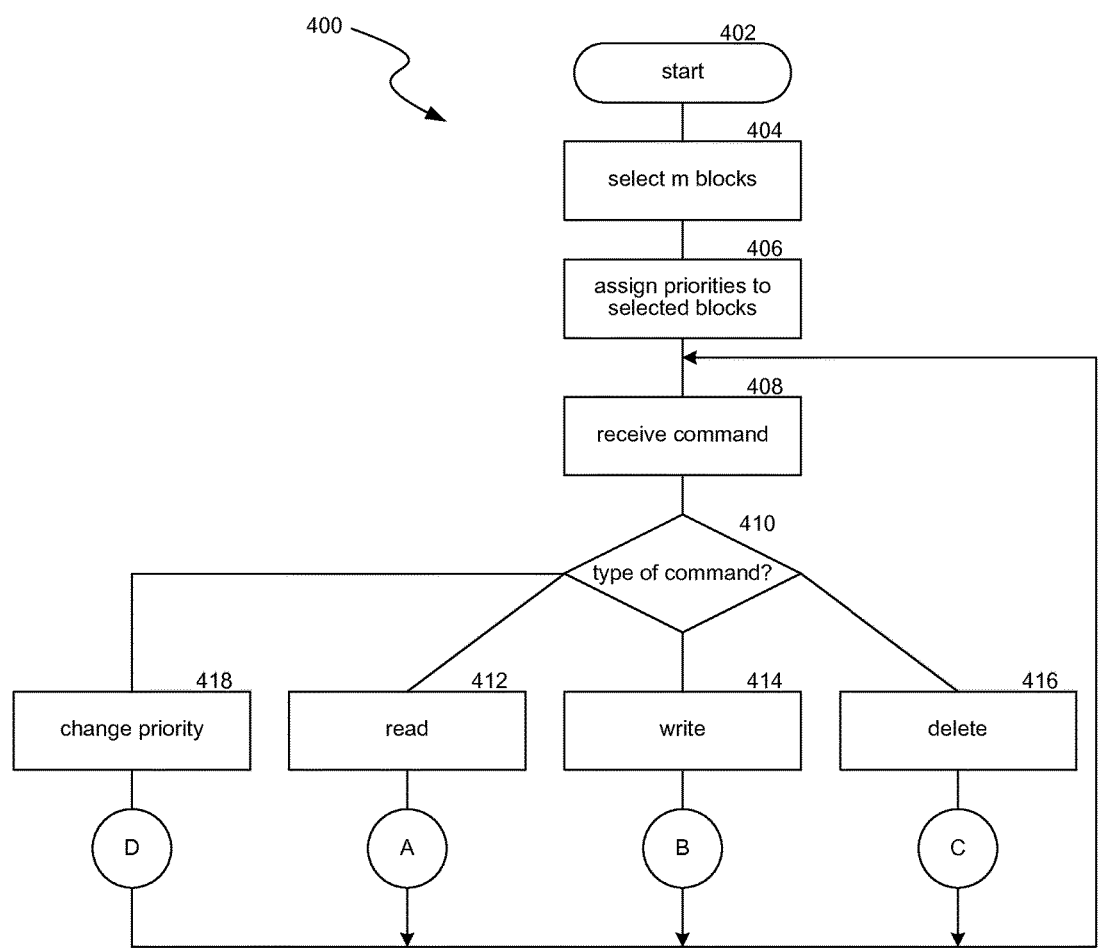
FIG. 4 is a flow diagram illustrating a routine for implementing a priority queue in a storage device, consistent with various embodiments.

FIG. 4 is a flow diagram illustrating a routine 400 for implementing a priority queue in a storage device, consistent with various embodiments. The routine 400 begins at block 402. At block 404, the routine 400 selects a specified number (M) of blocks. The selected blocks are indicated to be active blocks. At block 406, the routine 400 assigns priorities to the selected blocks. In various embodiments, the priorities may be distributed evenly, distributed to approximately balance the number of items stored in each block, etc. At block 408, the routine 400 receives a command (also referred to as an "operation") relating to the priority queue, e.g., to write an item, read an item, delete an item, or change the priority of an item. At decision block 410, the routine 400 determines the type of the received command. If the type of the received command is "read," the routine 400 continues at block 412. If the type of the received command is "write," the routine 400 continues at block 414. If the type of the received command is "delete," the routine 400 continues at block 416. If the type of the received command is "change priority," the routine 400 continues at block 418. The illustrated flow of these commands continues in FIGS. 5A-D.

Those skilled in the art will appreciate that the logic illustrated in FIG. 4 and described above, and in each of the flow diagrams discussed below, may be altered in various ways. For example, the order of the logic may be rearranged, substeps may be performed in parallel, illustrated logic may be omitted, other logic may be included, etc.

Figure 5A:
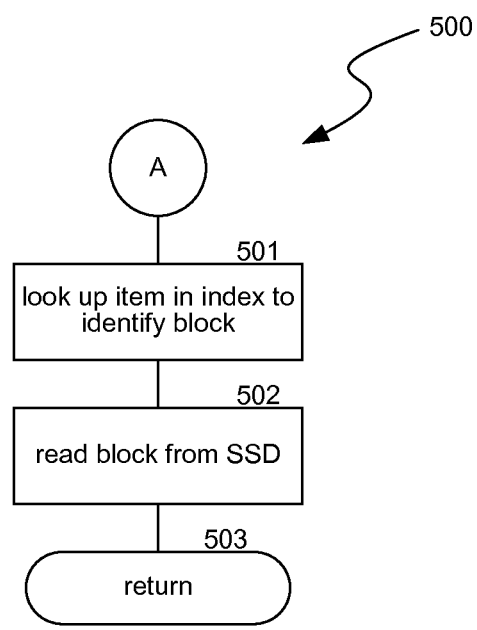
FIGS. 5A-D are portions of the flow diagrams illustrating various aspects for implementing a priority queue, consistent with various embodiments.

FIG. 5A illustrates a routine 500 to implement the "read" command. At block 501, the routine 500 looks up the item in the index to identify the block at which the item is stored. As an example, the routine 500 may look up the name of the item and identify a block at which the item is stored. At block 502, the routine 500 reads the identified block from the SSD and returns the item at block 503. In alternate embodiments, the routine 500 may simply read the item from the in-memory block.

Figure 5B:
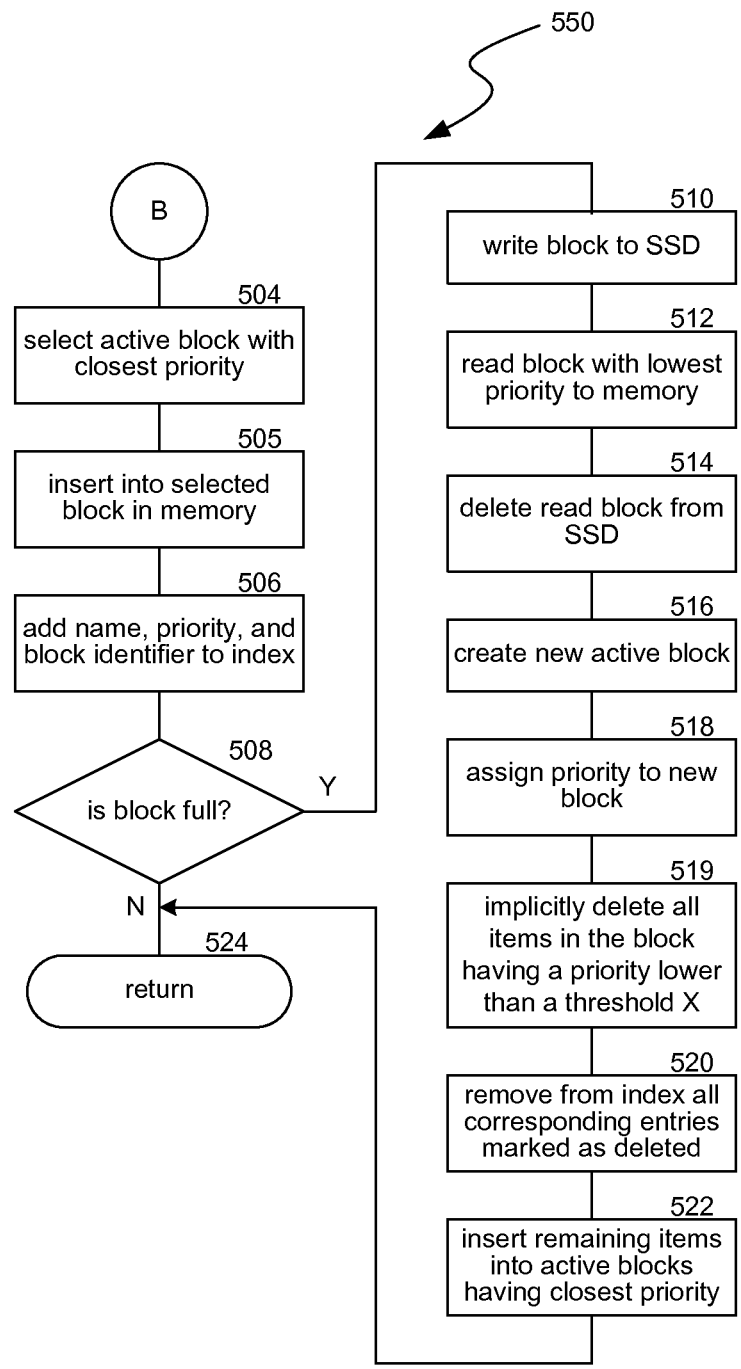

FIG. 5B illustrates a routine 550 to implement the "write" command. At block 504, the routine 550 selects an active block with the closest priority. As an example, if the item to be written has priority 31, the routine 550 may select block 204c illustrated in FIG. 2, because block 204c has a priority of 30, which is mathematically closer to 30 than priorities of the other blocks. At block 505, the routine 550 inserts the item into the selected block in memory but not the SSD. At block 506, the routine 550 adds to the index the name of the item, the indicated priority, and the SSD block identifier corresponding to the cached block in memory. At decision block 508, the routine 550 determines whether the block is full. If the block is full, the routine 550 continues at block 510. Otherwise, the routine 550 returns at block 524. The routine 550 then commits the cached block to the SSD and deletes the block with the lowest priority from the SSD. The logic for this deletion will now be explained in further detail. At block 510, the routine writes the now full block to the SSD. At block 512, the routine 550 reads the block with the lowest priority to memory. At block 514, the routine 550 deletes the block that was read from the SSD. At block 516, the routine creates a new active block. At block 518, the routine 550 assigns a priority to the new active block. In various embodiments, the priority may be assigned to minimize the maximum difference between the priority values for all active blocks. At block 519, the routine 550 implicitly deletes all items in the block having a priority lower than a threshold X (which can be determined by a system administrator; e.g., relative-priority 0.9). "Implicit deletion" can be defined as removing items from the SSD at eviction time without updating these items' priorities after they are inserted into corresponding blocks. For example, in an LRU cache, all items that have not been accessed after they are inserted into blocks can be implicitly deleted at eviction time. In some embodiments, the implicit deletion process can be done by not reinserting items to the block with the lowest priority (e.g., lowest 10%). At block 520, the routine 550 removes from the index all corresponding entries marked as deleted. At block 522, the routine 550 inserts the remaining items into active blocks that have the closest priority to the remaining items. The routine 550 then returns at block 524.

Figure 5C:
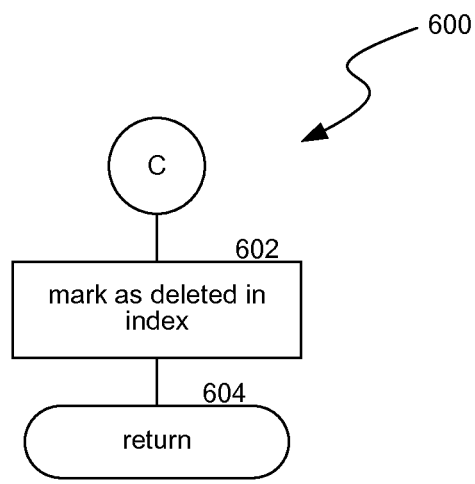

FIG. 5C illustrates a routine 600 to implement the "delete" command (please refer back to FIG. 4 and corresponding descriptions above). At block 602, the routine 600 marks, in the index, the item as deleted, but does not indicate any change in the SSD. The routine 600 then returns at block 604.

Figure 5D:
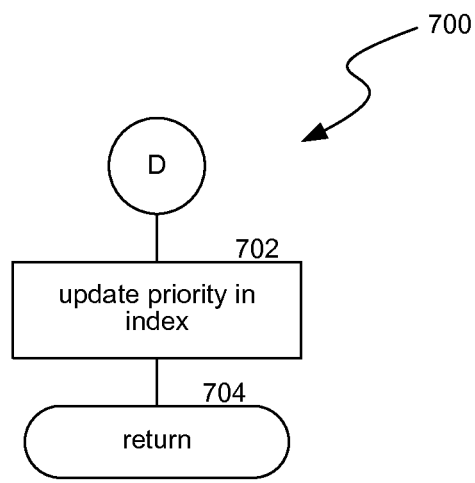

FIG. 5D illustrates a routine 700 to implement the "update priority" command (please refer back to FIG. 4 and corresponding descriptions above). At block 702, the routine 700 updates the priority for the item in the index. The routine 700 then returns at block 704.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method for implementing a priority queue in a storage device, comprising:
    dividing the storage device into multiple blocks;
    identifying, as active blocks, a subset of the multiple blocks, each active block associated with an active-block priority, wherein the active-block priority is determined based on a number of a set of items to be stored, and wherein the active-block priority is determined based on a set of item priorities corresponding to the set of items to be stored;
    creating multiple in-memory blocks, each created in-memory block corresponding to one of the active blocks and having the active-block priority of the corresponding active block;
    receiving an item of the set of items to be stored in the storage device and a corresponding item priority for the received item;
    adding, to an index, an entry corresponding to the received item, the entry including the item priority for the received item and an identification of a block at which the received item is to be stored;
    storing the received item in an in-memory block having an active-block priority closest to the received item; and
    in an event the in-memory block is full, writing contents of the full in-memory block to the storage device.

2. The method of claim 1, wherein each of the multiple blocks is larger than an item to be added to the multiple blocks, but much smaller than a total capacity of the storage device, the method further comprising:
- creating a new active block;
- assigning to the new active block an active-block priority that minimizes a maximum difference between active-block priority values for the other active blocks;
- reading into memory from the storage device a block having a lowest active-block priority;
- deleting the read block from the storage device;
- removing from the index entries corresponding to items in the read block that are indicated in the index as having been deleted; and
- inserting into active blocks having a closest active-block priority items in the read block that are not indicated in the index as having been deleted.

3. The method of claim 1, further comprising reading from the storage device a requested item upon receiving a read command for the requested item.

4. The method of claim 1, further comprising deleting in the index but not the storage device an item upon receiving a delete command for the item.

5. The method of claim 1, further comprising updating an item priority for an item in an index but not the storage device upon receiving a command to update the item priority for the item.

6. The method of claim 1, further comprising providing an application program interface configured to receive storage commands and item priorities for stored items.

7. A computer-readable storage medium storing instructions for implementing a priority queue in a storage device, comprising:
- instructions for dividing the storage device into multiple blocks;
- instructions for identifying, as active blocks, a subset of the multiple blocks, each active block associated with an active-block priority, wherein the active-block priority is determined based on a number of a set of items to be stored, and wherein the active-block priority is determined based on a set of item priorities corresponding to the set of items to be stored;
- instructions for creating multiple in-memory blocks, each created in-memory block corresponding to one of the active blocks and having the active-block priority of the corresponding active block;
- instructions for receiving an item to be stored of the set of items in the storage device and a corresponding item priority for the received item;
- instructions for adding, to an index, an entry corresponding to the received item, the entry including the item priority for the received item and an identification of a block at which the received item is to be stored;
- instructions for storing the received item in an in-memory block having an active-block priority closest to the received item; and
- instructions for writing contents of the full in-memory block to the storage device, in an event the in-memory block is full.

8. The computer-readable storage medium of claim 7, wherein each of the multiple blocks is larger than an item to be added to the multiple blocks, but much smaller than a total capacity of the storage device, the computer-readable storage medium further comprising:
- instructions for creating a new active block;
- instructions for assigning to the new active block an active-block priority that minimizes a maximum difference between active-block priority values for the other active blocks;
- instructions for reading into memory from the storage device a block having a lowest active-block priority;
- instructions for implicitly deleting the read block from the storage device;
- instructions for removing from the index entries corresponding to items in the read block that are indicated in the index as having been deleted; and
- instructions for inserting into active blocks having a closest active-block priority items in the read block that are not indicated in the index as having been deleted.

9. The computer-readable storage medium of claim 7, further comprising instructions for reading from the storage device a requested item upon receiving a read command for the requested item.

10. The computer-readable storage medium of claim 7, further comprising instructions for deleting in the index but not the storage device an item upon receiving a delete command for the item.

11. The computer-readable storage medium of claim 7, further comprising instructions for updating an item priority for an item in an index but not the storage device upon receiving a command to update the item priority for the item.

12. The computer-readable storage medium of claim 7, further comprising instructions for providing an application program interface configured to receive storage commands and item priorities for stored items.

13. A system, comprising:
- a storage device;
- multiple blocks defined at the storage device, wherein at least some of the multiple blocks identified as active blocks, and each active block having associated therewith an active-block priority, wherein the active-block priority is determined based on a number of a set of items to be stored, and wherein the active-block priority is determined based on a set of item priorities corresponding to the set of items to be stored;
- a memory, wherein a portion of the memory has in-memory blocks corresponding to the active blocks and a portion of the memory has an index; and
- a component configured to receive an item of the set of items to be stored in the storage device and a corresponding item priority for the received item, add to an index an entry corresponding to the received item, the entry including the item priority for the received item and an identification of a block at which the received item is to be stored, store the received item in an in-memory block having an active-block priority closest to the received item, and in an event the in-memory block is full, write contents of the full in-memory block to the storage device.

14. The system of claim 13, further comprising:
- a component configured to create a new active block, assign to the new active block an active-block priority that minimizes a maximum difference between active-block priority values for the other active blocks, read into memory from the storage device a block having a lowest active-block priority, delete the read block from the storage device, remove from the index entries corresponding to items in the read block that are indicated in the index as having been deleted, and insert into active blocks having a closest active-block priority items in the read block that are not indicated in the index as having been deleted.

15. The system of claim 13, further comprising a component configured to read from the storage device a requested item upon receiving a read command for the requested item.

16. The system of claim 13, further comprising a component configured to delete in the index but not the storage device an item upon receiving a delete command for the item.

17. The system of claim 13, further comprising a component configured to update an item priority for an item in an index but not the storage device upon receiving a command to update the item priority for the item.

18. The system of claim 13, further comprising a component configured to provide an application program interface configured to receive storage commands and item priorities for stored items.

19. The system of claim 13, wherein the storage device is a solid state drive, and wherein each of the multiple blocks is larger than the item to be stored in the storage device.

20. The system of claim 13, wherein the storage device is a memory-based storage device.

\* \* \* \* \*